United States Patent
Chung

(10) Patent No.: US 7,861,831 B2
(45) Date of Patent: Jan. 4, 2011

(54) FRONT WHEEL BRAKE DEVICE FOR FORKLIFTS

(75) Inventor: Gyou Ryeon Chung, Seoul (KR)

(73) Assignee: Doosan Infracore Co., Ltd., Dong-gu, Incheon (KR)

( * ) Notice: Subject to any disclaimer, the term of this patent is extended or adjusted under 35 U.S.C. 154(b) by 1047 days.

(21) Appl. No.: 11/630,431

(22) Filed: Dec. 22, 2006

(65) Prior Publication Data
US 2008/0116020 A1   May 22, 2008

(30) Foreign Application Priority Data
Dec. 27, 2005   (KR) ...................... 10-2005-0130203

(51) Int. Cl.
*F16D 55/36* (2006.01)
(52) U.S. Cl. .................................... 188/71.5; 188/72.9
(58) Field of Classification Search ............... 188/71.5, 188/71.1, 72.6, 72.9, 73.1, 73.31
See application file for complete search history.

(56) References Cited
U.S. PATENT DOCUMENTS
5,147,255 A * 9/1992 Strehler et al. .............. 475/311
5,190,123 A * 3/1993 Hvolka ........................ 188/71.6
6,516,924 B1 * 2/2003 Michael et al. ............. 188/71.5
2009/0277727 A1 * 11/2009 Ueno ........................ 188/71.5

FOREIGN PATENT DOCUMENTS
DE        4011304 C1 *  8/1991
DE       10132355 A1 *  1/2003

* cited by examiner

*Primary Examiner*—Pam Rodriguez
(74) *Attorney, Agent, or Firm*—Brouse McDowell; Heather M. Barnes

(57) ABSTRACT

A front wheel brake device for forklifts is used in applying brake to a front wheel attached to opposite lateral bottom sides of a mast assembly. The device includes a support bracket provided at the bottom sides of the mast assembly, a brake housing fixed to the support bracket and received within the front wheel, a wheel hub fixedly secured to the front wheel, an axle shaft rotatably provided within the brake housing and engaged with a shaft portion of the wheel hub for unitary rotation with the front wheel, brake discs axially movably fitted to the axle shaft for unitary rotation therewith, friction plates alternately arranged between the brake discs and fitted to the brake housing for movement in an axial direction of the axle shaft, and a piston provided within the brake housing for, when operated, pressing the friction plates against the brake discs.

14 Claims, 5 Drawing Sheets

Prior Art

Fig. − 3

FRONT WHEEL BRAKE DEVICE FOR FORKLIFTS

This application claims the benefit of the Korean Patent Application No. 10-2005-130203, filed on Dec. 27, 2005, the disclosure of which is hereby incorporated by reference as if fully set forth herein.

I. FIELD OF INVENTION

The present invention pertains to a front wheel brake device for forklifts and, more particularly, to a front wheel brake device for forklifts that can effectively improve the braking performance of a forklift by adopting a structure that enables a disc brake known for its excellent braking performance to be mounted even in a narrow installation space.

II. BACKGROUND OF THE INVENTION

A forklift is used in raising, lowering or transporting cargos of heavyweight nature. Referring to FIG. 1, there is shown a conventional forklift of the type including a vehicle body 1 and a mast assembly 3 attached to a front portion of the vehicle body 1.

The mast assembly 3 includes a carriage 5 moving up and down along a frontal surface thereof and a pair of forks 5a extending forwards from the carriage 5. Hinge pins 3a protrude laterally outwardly from opposite side surfaces of the mast assembly 3. The hinge pins 3a are received in reception grooves 1a of the vehicle body 1 and then held in place by virtue of caps 1b mating with the reception grooves 1a, whereby the mast assembly 3 becomes tiltable with respect to the vehicle body 1.

Support brackets 7 are attached to opposite bottom side portions of the mast assembly 3 in a vertical orientation, and axle shafts 7a extend laterally outwardly from the support brackets 7 in a horizontal direction. Provided on the axle shafts 7a are front wheels 8 and brake devices (not shown) for holding the front wheels 8 against movement.

In the prior art forklift noted above, spaces for accommodating the brake devices, i.e., spaces left between the axle shafts 7a and the front wheels 8, are quite narrow. For this reason, shoe brakes requiring no wide installation space have been used as the brake devices.

However, the mast assembly 3 that employs shoe brakes as the brake devices for applying brake to the front wheels 8 suffers from reduction in braking performance. In other words, the forklift requires enhanced braking performance inasmuch as the vehicle body and the cargos handled by the forklift are intrinsically heavyweight. Notwithstanding such a requirement, the shoe brakes employed in the prior art forklift shows poor braking performance, which in turn may cause a safety problem.

Another drawback of the conventionally used shoe brakes resides in that, for replacement of worn-out brake shoes or for repair of internal parts, the brake devices need to be dismantled in their entirety after detaching and removing the front wheels 8 from the axle shafts 7a one by one. This may prolong maintenance time and impair maintainability.

III. SUMMARY OF THE INVENTION

In view of the above-noted problems inherent in the prior art, it is therefore an object of the present invention to provide a front wheel brake device for forklifts of the construction allowing a wet multi-disc brake with improved braking performance to be placed within a narrow installation space.

Another object of the present invention is to provide a front wheel brake device for forklifts that makes it possible to repair internal parts without having to detach front wheels one by one and dismantling the brake device in its entirety, thereby greatly improving maintainability thereof.

In order to accomplish the above object, the present invention provides a front wheel brake device for forklifts for use in applying brake to a front wheel attached to opposite lateral bottom sides of a mast assembly, including: a support bracket provided at the opposite lateral bottom sides of the mast assembly; a brake housing fixed to the support bracket at a first end and received within the front wheel at a second end; a wheel hub fixedly secured to the front wheel, the wheel hub having a shaft portion extending toward the brake housing; an axle shaft rotatably provided within the brake housing and engaged with the shaft portion of the wheel hub for unitary rotation with the front wheel; a plurality of brake discs axially movably fitted to an outer circumference of the axle shaft in a spaced-apart relationship with one another for unitary rotation with the axle shaft; a plurality of friction plates alternately arranged between the brake discs and fitted to an inner circumference of the brake housing for movement in an axial direction of the axle shaft; and a piston provided within the brake housing for, when operated, pressing the friction plates against the brake discs.

Preferably, the brake housing may have an opening portion formed at the second end and a bearing arranged inside the opening portion, the shaft portion of the wheel hub being rotatably supported on the opening portion of the brake housing by the bearing, the axle shaft being spline-engaged with the shaft portion of the wheel hub for unitary rotation with the wheel hub.

IV. BRIEF DESCRIPTION OF THE DRAWINGS

The above and other objects, features and advantages of the present invention will be more clearly understood from the following detailed description taken in conjunction with the accompanying drawings, in which.

V. DESCRIPTION OF THE PREFERRED EMBODIMENT

Figure 1:
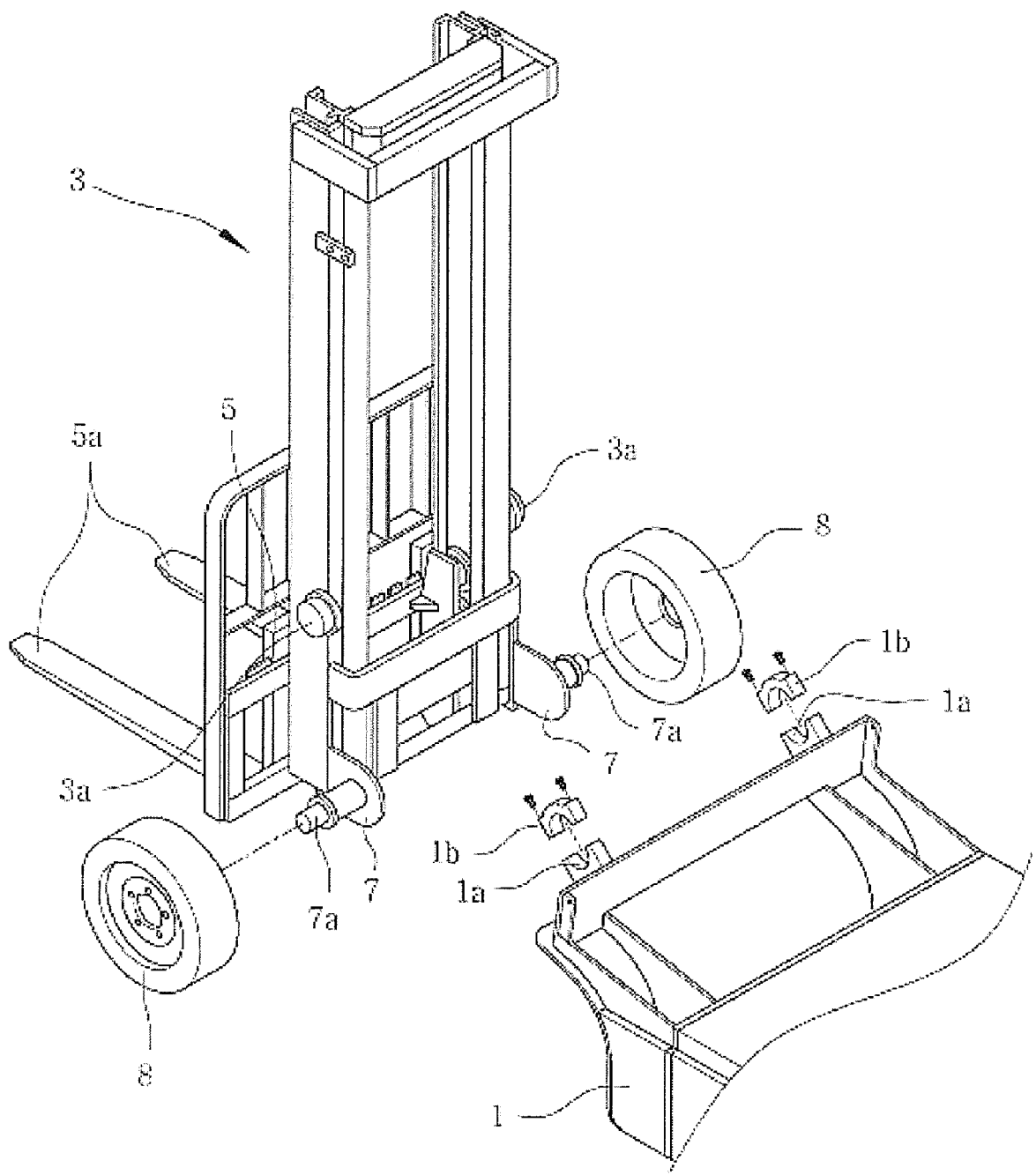
FIG. 1 is an exploded perspective view showing a mast assembly and front wheels employed in a prior art forklift.

Hereinafter, a front wheel brake device for forklifts according to a preferred embodiment of the present invention will be described in detail with reference to the accompanying drawings. The same parts or components as those of the prior art forklift mentioned earlier will be designated and described with like reference numerals.

Figure 2:
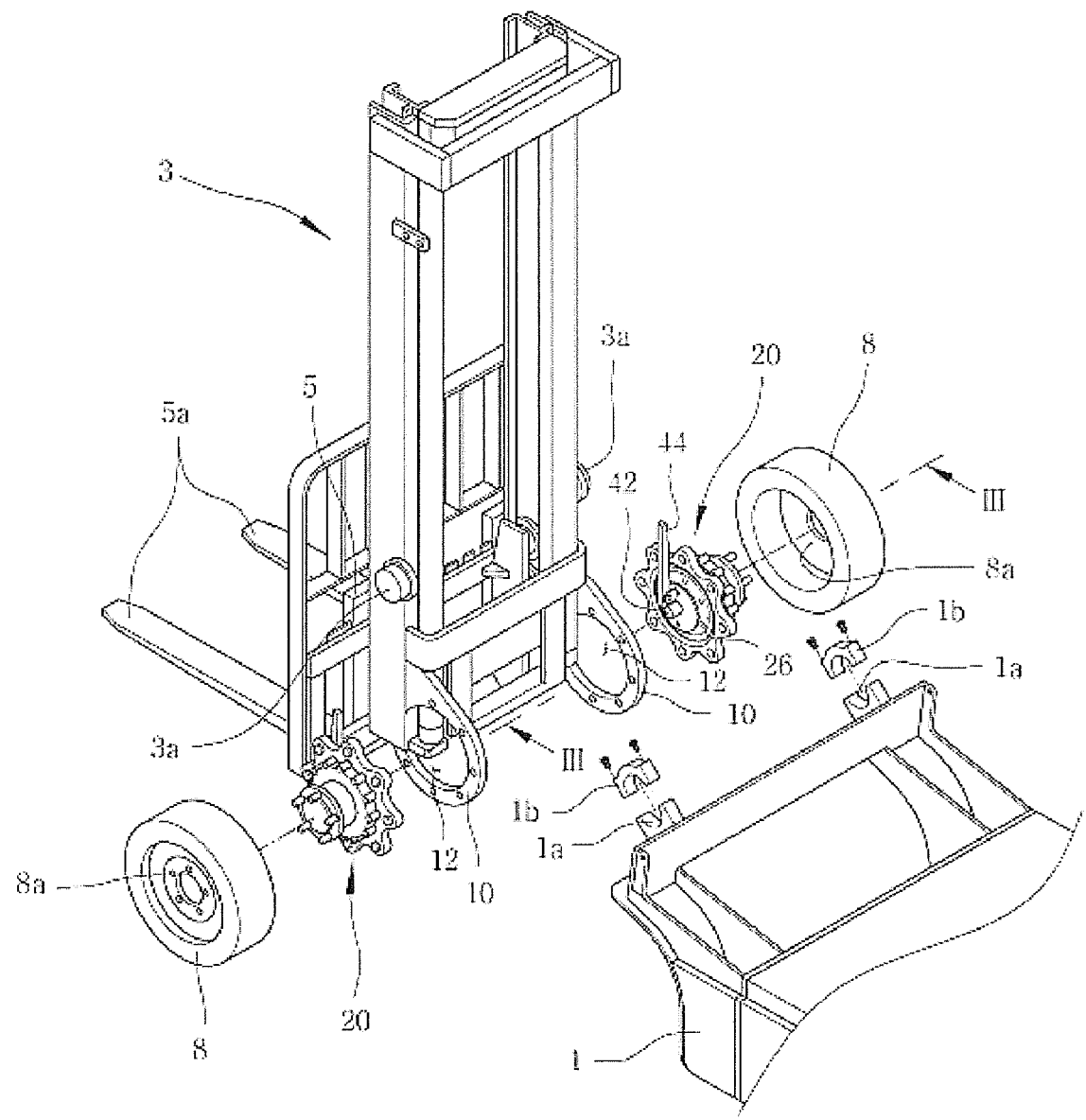
FIG. 2 is an exploded perspective view illustrating a forklift incorporating a front wheel brake device in accordance with an embodiment of the present invention.
Figure 3:
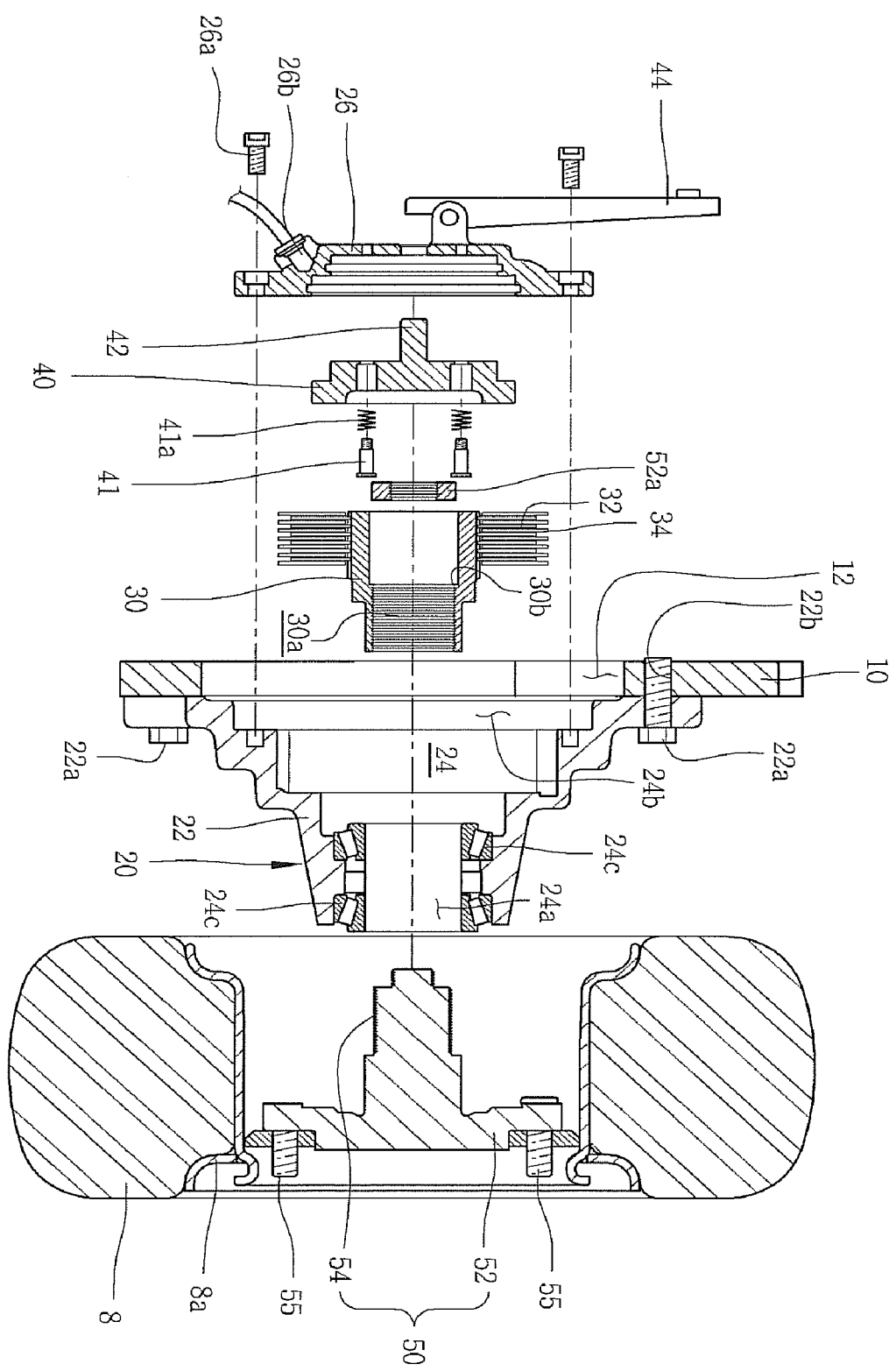
FIG. 3 is a sectional view taken along line III-III in FIG. 2, showing the front wheel brake device of the present invention in an exploded state.
Figure 4:
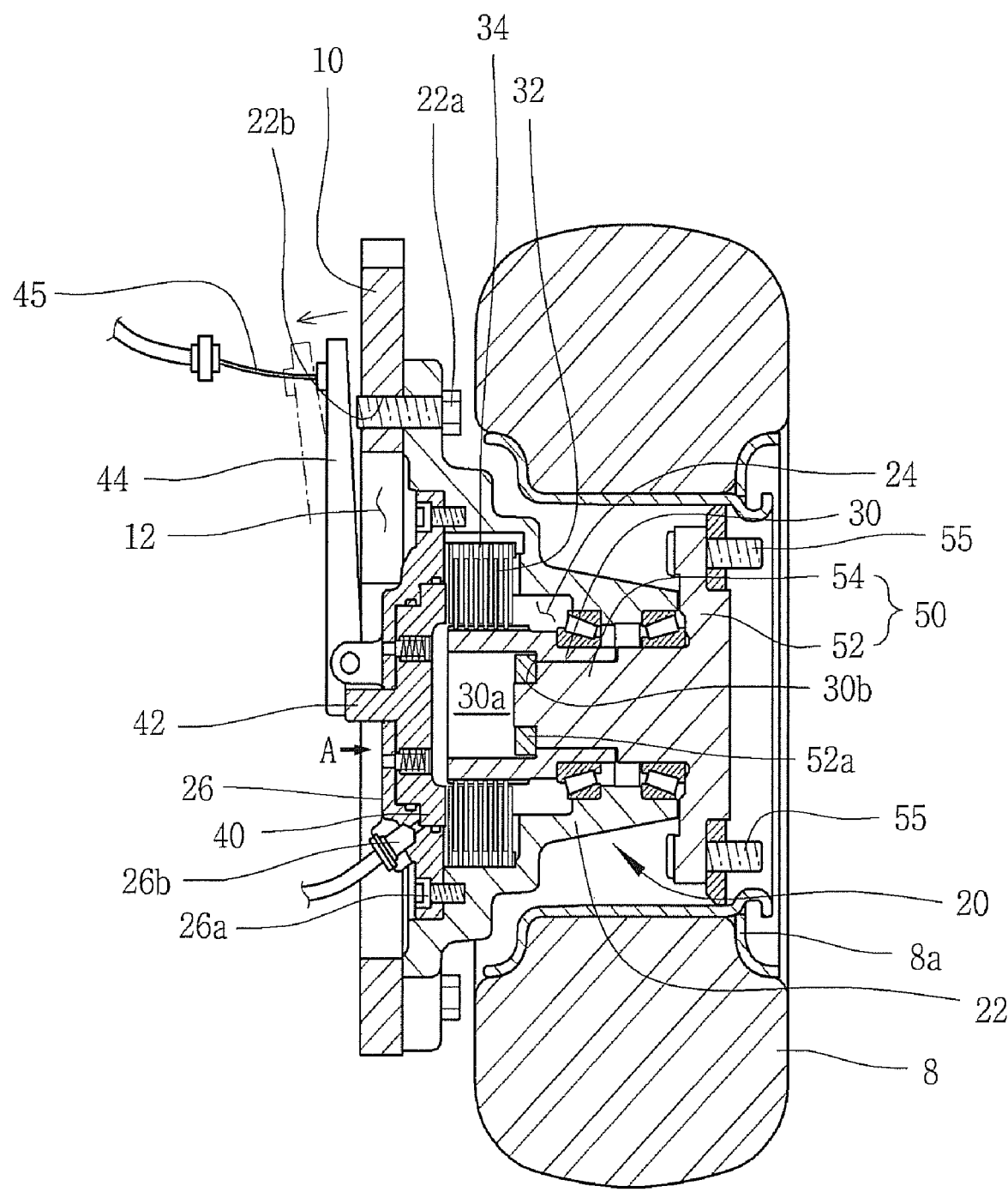
FIG. 4 is a sectional view similar to FIG. 3 but showing the front wheel brake device of the present invention in an assembled state.
Figure 5:
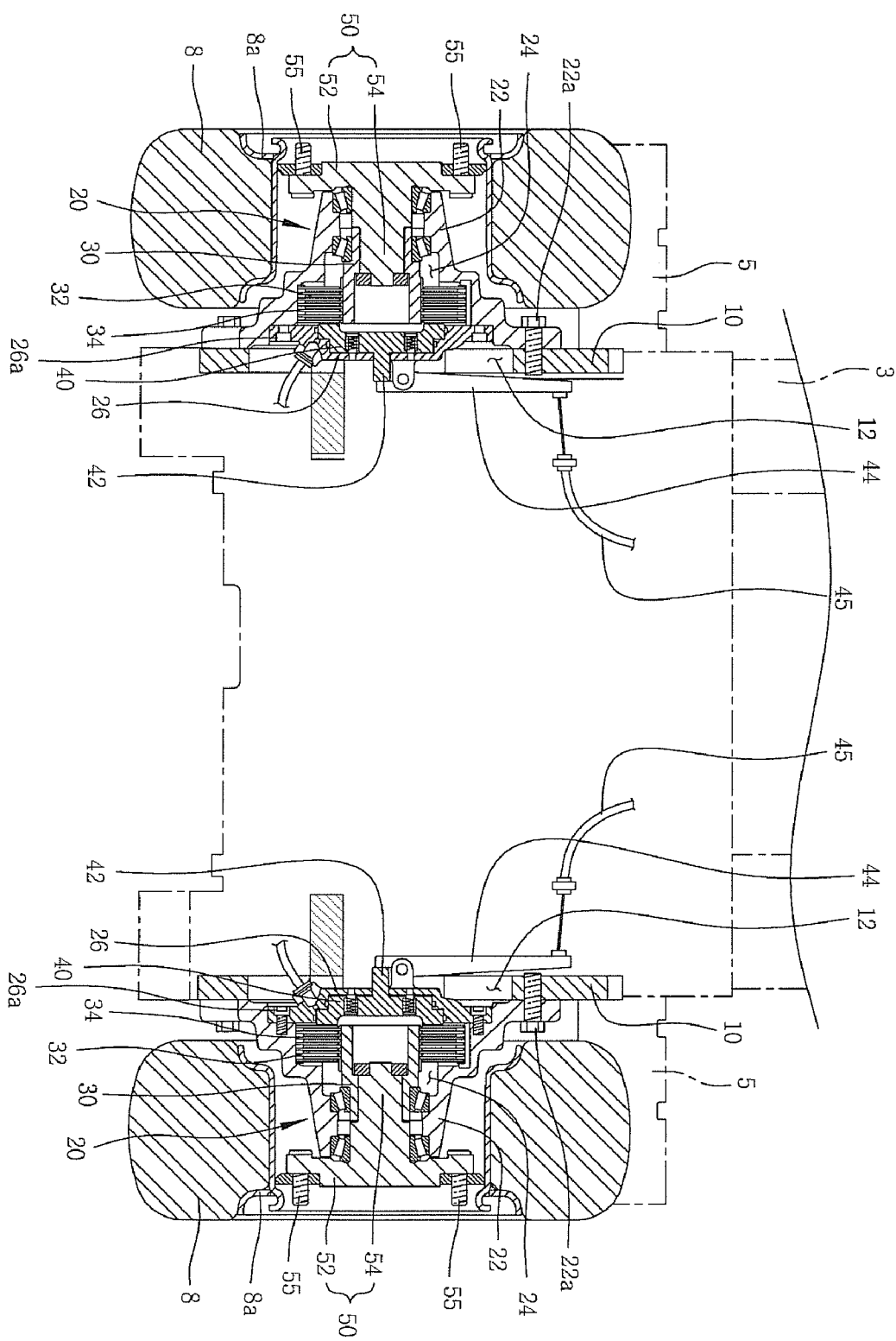
FIG. 5 is a sectional view illustrating a state that the front wheel brake devices are mounted to the forklift at opposite lateral bottom sides of a mast assembly.

Referring to FIGS. 2 through 5, the forklift according to an embodiment of the present invention includes a vehicle body 1, a mast assembly 3 and a wet multi-disc brake device 20 (herein below simply referred to as "disc brake device").

Support brackets 10 are formed in opposite bottom side portions of the mast assembly 3. The support brackets 10 protrude rearwards from the mast assembly 3 in an annular shape and lie below the vehicle body 1 at the time when the mast assembly 3 remains attached to the vehicle body 1.

Each of the support brackets 10 has, at its center portion, an access opening 12 that permits access to a brake compartment of a below-mentioned brake housing 22 therethrough and, at its peripheral portion, a plurality of coupling holes 22b with which coupling bolts 22a are threadedly engaged to secure the brake housing 22 to the corresponding support bracket 10.

The disc brake device 20 is provided with the brake housing 22. The brake housing 22 is formed into such a shape that grows thinner as it comes closer the corresponding front wheel 8, and is arranged within a narrow space between a rim of the front wheel 8 and a shaft portion 54 of a below-mentioned wheel hub 50.

The brake housing 22 has an internal brake compartment 24, a first opening portion 24a opened laterally outwardly with respect to the vehicle body 1 and a second opening portion 24b opened laterally inwardly with respect to the vehicle body 1.

The second opening portion 24b of the brake housing 22 communicates with the access opening 12 of the corresponding support bracket 10 and is openably closed by a cover 26. The cover 26 is secured to the brake housing 22 with fixing bolts 26a and can be removed from the brake housing 22, if necessary, to thereby open the brake compartment 24 of the brake housing 22.

Once the brake compartment 24 is opened, brake parts can be easily taken out from or put into the brake compartment 24 for replacement or repair thereof, which helps to improve maintainability of the disc brake device 20. In this regard, the cover 26 is sized such that, when detached from the brake housing 22, it can be taken out to the outside through the access opening 12 of the corresponding support bracket 10. This means that the brake parts can be taken out from or put into the brake compartment 24 through the access opening 12, thus enhancing maintainability of the disc brake device 20. To this end, the cover 26 is formed with a smaller size than the access opening 12 of the corresponding support bracket 10.

In the meantime, a tubular axle shaft 30 is provided in the brake compartment 24 of the brake housing 22. The axle shaft 30 is supported at one end circumference on a bearing 24c fitted to the first opening portion 24a of the brake housing 22, so that the axle shaft 30 can be rotated within the brake compartment 24. The axle shaft 30 is provided at the other end circumference with a multiple number of brake discs 32 that are arranged in a spaced-apart relationship with one another.

The brake discs 32 are spline-engaged with the axle shaft 30 in such a manner that they can be rotated together with the axle shaft 30 as a unit and can be displaced in an axial direction. Friction plates 34 are alternately arranged between the respective brake discs 32 and spline-engaged with an inner circumferential surface of the brake housing 22 in an axially displaceable manner.

A piston 40 is provided inside the brake compartment 24 of the brake housing 22. The piston 40 is axially movably attached to the cover 26 by means of bolts 41, which pass through the piston 40 for thread engagement with the cover 26, in such a fashion that a gap (fluid chamber) having a predetermined size is created between the cover 26 and the piston 40. Presence of the gap allows the piston 40 to reciprocatingly move toward or away from the brake discs 32 and the friction plates 34 within the brake compartment 24. Upon removal of the cover 26 from the brake housing 22, the piston 40 is removed together with the cover 26. This makes it possible to replace the brake discs 32 or the friction plates 34 merely by removing the cover 26 but without detaching the front wheels 8. Thus, it becomes possible to eliminate any difficulty or troublesomeness involved in detaching front wheels for maintenance of a brake device, as is the case in the prior art forklifts.

Retained on shank portions the bolts 41 are springs 41a for resiliently biasing the piston 40 toward the cover 26. With this configuration, if hydraulic fluid under pressure is introduced into the gap (fluid chamber) between the cover 26 and the piston 40 through an oil passage 26b, the piston 40 is moved in the direction indicated by an arrow "A" in FIG. 4. By this movement, the piston 40 presses the friction plates 34 against the brake discs 32 to thereby generate a braking force. If the hydraulic fluid is drained through the oil passage 26b, the piston 40 is returned back to an original position under the biasing force of the springs 41a, thereby removing the braking force. In this connection, the hydraulic fluid is supplied to the oil passage 26b via a specified route as a vehicle driver depresses a brake pedal (not shown) during a traveling process.

The piston 40 is provided at a back surface thereof with a push head 42 that, when the piston 40 is mounted in place, passes through the cover 26 and protrudes to the outside thereof. The push head 42 is adapted to be pressed by a push lever 44 pivotally attached to the cover 26. If the push head 42 is pressed, the piston 40 is moved in such a direction that the friction plates 34 and the brake discs 32 are pressed against one another, thereby generating a braking force.

The push lever 44 is connected by a parking cable 45 to a parking brake lever (not shown) provided in the vicinity of a driver's seat. If a driver occupying the driver's seat manipulates the parking brake lever for parking purpose, the parking cable 45 is pulled so that the push lever 44 can be swung into a position indicated by a single-dotted chain line in FIG. 4, thus applying brake in the manner as set forth above.

Referring again to FIGS. 2 through 5, a wheel hub 50 is rotatably attached to the brake housing 22. The wheel hub 50 has a coupling plate portion 52 fixedly secured to the rim 8a of the corresponding front wheel 8 and a shaft portion 54 extending laterally inwardly of the coupling plate portion 52. The shaft portion 54 is inserted into the first opening portion 24a of the brake housing 22 and rotatably supported at its proximal end extension on the first opening portion 24a by means of the bearing 24c. The shaft portion 54 inserted into the first opening portion 24a is spline-engaged at its distal end extension with a bore 30a of the axle shaft 30 for unitary rotation with the axle shaft 30.

A fixing nut 52a is threadedly engaged with a terminal end portion of the shaft portion 54 and is seated on a shoulder portion 30b within the bore 30a of the axle shaft 30, thereby preventing the shaft portion 54 from being separated from the axle shaft 30.

The coupling plate portion 52 is received in the rim 8a of the corresponding front wheel 8 and fastened to the rim 8a by means of bolts 55. The wheel hub 50 of this construction serves to fix each of the front wheels 8 to the axle shaft 30 of the disc brake device 20, thereby ensuring that the braking force applied to the axle shaft 30 is transferred to the front wheel 8.

Next, description will be given to an exemplary operation of the front wheel brake device for forklifts configured as above.

In a traveling process, the brake device operates as follows. If a driver depresses a brake pedal (not shown) while the forklift travels, hydraulic fluid is supplied to the oil passage 26b via a specified route and then filled into the gap between the cover 26 and the piston 40. The hydraulic fluid thus supplied acts to press and displace the piston 40 toward the friction plates 34 and the brake discs 32, whereby the innermost friction plate 34 is first pushed laterally outwardly and, then, all of the friction plates 34 and the brake discs 32 are pressed against one another. As a consequence, a braking force is generated by frictional contact between the friction plates 34 and the brake discs 32, thereby applying brake to the front wheels 8 in the traveling process.

In a parking condition, the brake device operates as follows. If the forklift is stopped and the parking cable 45 is pulled by manipulation of a parking brake lever lying alongside a driver's seat, the push lever 44 is swung into the position indicated by a chain line in FIG. 4. Thus, the push lever 44 presses the push head 42 of the piston 40, in response to which the piston 40 is displaced toward the friction plates 34 and the brake discs 32, whereby the innermost friction plate 34 is first pushed laterally outwardly and, then, all of the friction plates 34 and the brake discs 32 are pressed against one another. As a consequence, a braking force is generated by frictional contact between the friction plates 34 and the brake discs 32, thereby applying brake to the front wheels 8 in the parking condition.

According to the present invention as described above, the front wheel brake device for forklifts is provided with a compact disc brake small enough to be received within a rim of a front wheel, a support bracket for attaching the compact disc brake to a mast assembly and a wheel hub for interconnecting the compact disc brake and the front wheel. Thanks to this fact, it becomes possible to arrange the disc brake with improved braking performance within a narrow installation space between the front wheel and the mast assembly. This helps to remarkably improve braking performance of a forklift.

Furthermore, in accordance with the present invention, the disc brake of the front wheel brake device for forklifts has an internal brake compartment openably closed by a cover that can be removed, if necessary, to permit access to the brake compartment. Thus, by merely removing the cover, the brake compartment of the disc brake can be opened for replacement of consumption articles such as brake discs, friction plates and the like. This helps to greatly improve maintainability of the front wheel brake device.

While the invention has been described in respect of one preferred embodiment, it will be understood by those skilled in the art that the present invention is not limited to the foregoing embodiment but various changes and modifications may be made without departing from the scope of the invention as defined in the claims.

What is claimed is:

1. A front wheel braking device for forklifts for use in applying brake to a front wheel attached to opposite lateral bottom sides of a mast assembly, comprising:
    a support bracket provided at the opposite lateral bottom sides of the mast assembly;
    a brake housing fixed to the support bracket at a first end and received within the front wheel at a second end;
    a wheel hub fixedly secured to the front wheel, the wheel hub having a shaft portion extending toward the brake housing;
    an axle shaft rotatably provided within the brake housing and engaged with the shaft portion of the wheel hub for unitary rotation with the front wheel;
    a plurality of brake discs axially movably fitted to an outer circumference of the axle shaft in a spaced-apart relationship with one another for unitary rotation with the axle shaft;
    a plurality of friction plates alternately arranged between the brake discs and fitted to an inner circumference of the brake housing for movement in an axial direction of the axle shaft; and
    a piston provided within the brake housing for, when operated, pressing the friction plates against the brake discs,
    wherein the brake housing has a size and the wheel has an inner size, the size of the brake housing surrounding the wheel hub is smaller than the inner size of the wheel so that the brake housing can be disposed inside the wheel.

2. The front wheel brake device for forklifts as recited in claim 1, wherein the brake housing has an opening portion formed at the second end and a bearing arranged inside the opening portion, the shaft portion of the wheel hub being rotatably supported on the opening portion of the brake housing by the bearing, the axle shaft being spline-engaged with the shaft portion of the wheel hub for unitary rotation with the wheel hub.

3. The front wheel brake device for forklifts as recited in claim 2, wherein the axle shaft is formed into a tubular shape and opened at opposite first and second ends, the axle shaft being spline-engaged with the shaft portion of the wheel hub by inserting the shaft portion into the axle shaft at the first end of the axle shaft, and further comprising
    a fixing nut inserted into the axle shaft at the second end of the axle shaft for thread engagement with a terminal end portion of the shaft portion of the wheel hub.

4. The front wheel brake device for forklifts as recited in claim 2, further comprising
    a cover for openably closing an internal space of the brake housing, and wherein the support bracket has an access opening for permitting access to the internal space of the brake housing when the cover is removed.

5. The front wheel brake device for forklifts as recited in claim 4, further comprising
    a manual operation means for manually displacing the piston, the manual operation means comprising a push head protruding from a back surface of the piston to outside the cover, a push lever attached to the brake housing for pressing the push head through swing movement and a cable for, when pulled, causing the push lever to make the swing movement.

6. The front wheel brake device for forklifts as recited in claim 2, further comprising
    a manual operation means for manually displacing the piston, the manual operation means comprising a push head protruding from a back surface of the piston to outside the brake housing, a push lever attached to the brake housing for pressing the push head through swing movement and a cable for, when pulled, causing the push lever to make the swing movement.

7. The front wheel brake device for forklifts as recited in claim 1, further comprising
    a cover for operably closing an internal space of the brake housing, and wherein the support bracket has an access opening for permitting access to the internal space of the brake housing when the cover is removed.

8. The front wheel brake device for forklifts as recited in claim 7, further comprising
    a manual operation means for manually displacing the piston, the manual operation means comprising a push head protruding from a back surface of the piston to outside the cover, a push lever attached to the cover for pressing the push head through swing movement and a cable for, when pulled, causing the push lever to make the swing movement.

9. The front wheel brake device for forklifts as recited in claim 1, further comprising
a manual operation means for manually displacing the piston, the manual operation means comprising a push head protruding from a back surface of the piston to outside the brake housing, a push lever attached to the brake housing for pressing the push head through swing movement and a cable for, when pulled, causing the push lever to make the swing movement.

10. The front wheel brake device for forklift as recited in claim 1, wherein the support bracket has an access opening that allows a portion of the brake housing to pass therethrough.

11. The front wheel brake device for forklift as recited in claim 10, wherein the support bracket has a plurality of coupling holes at a peripheral portion of the support bracket so that coupling blots are engaged to secure the brake housing to the corresponding support bracket.

12. A front wheel braking device for forklifts for use in applying brake to a front wheel attached to opposite lateral bottom sides of a mast assembly, comprising:
a brake housing fixed to a support bracket at a first end and received within the front wheel at a second end, wherein the brake housing at least partially defines an internal space;
wherein the support bracket is provided at the opposite lateral bottom sides of the mast assembly and the support bracket comprises an access opening for permitting access to the internal space of the brake housing;
a wheel hub fixedly secured to the front wheel, the wheel hub having a shaft portion extending toward the brake housing;
an axle shaft rotatably provided within the brake housing and engaged with the shaft portion of the wheel hub for unitary rotation with the front wheel;
a plurality of brake discs axially movably fitted to an outer circumference of the axle shaft in a spaced-apart relationship with one another for unitary rotation with the axle shaft;
a plurality of friction plates alternately arranged between the brake discs and fitted to an inner circumference of the brake housing for movement in an axial direction of the axle shaft; and
a piston provided within the brake housing for, when operated, pressing the friction plates against the brake discs,
wherein the brake housing has a size and the wheel has an inner size, the size of the brake housing surrounding the wheel hub is smaller than the inner size of the wheel so that the brake housing can be disposed inside the wheel.

13. The front wheel brake device for forklift as recited in claim 12, wherein the access opening allows a portion of the brake housing to pass therethrough.

14. The front wheel brake device for forklift as recited in claim 13, wherein the support bracket has a plurality of coupling holes at a peripheral portion of the support bracket so that coupling blots are engaged to secure the brake housing to the corresponding support bracket.

* * * * *